(12) United States Patent
Park et al.

(10) Patent No.: US 9,460,856 B2
(45) Date of Patent: Oct. 4, 2016

(54) MULTILAYER CERAMIC CAPACITOR AND BOARD HAVING THE SAME

(71) Applicant: SAMSUNG ELECTRO-MECHANICS CO., LTD., Suwon-Si, Gyeonggi-Do (KR)

(72) Inventors: Sang Soo Park, Suwon-Si (KR); Min Cheol Park, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 174 days.

(21) Appl. No.: 14/516,384

(22) Filed: Oct. 16, 2014

(65) Prior Publication Data

US 2016/0035491 A1 Feb. 4, 2016

(30) Foreign Application Priority Data

Jul. 29, 2014 (KR) .................. 10-2014-0096350

(51) Int. Cl.
| | |
|---|---|
| H01G 4/30 | (2006.01) |
| H01G 4/248 | (2006.01) |
| H01G 4/012 | (2006.01) |
| H01G 4/12 | (2006.01) |
| H01G 2/06 | (2006.01) |

(52) U.S. Cl.
CPC ............... *H01G 4/30* (2013.01); *H01G 2/065* (2013.01); *H01G 4/012* (2013.01); *H01G 4/12* (2013.01); *H01G 4/248* (2013.01)

(58) Field of Classification Search
CPC ........ H01G 4/30; H01G 4/005; H01G 4/012; H01G 4/228; H01G 4/232; H01G 4/248
See application file for complete search history.

(56) References Cited

U.S. PATENT DOCUMENTS

| 6,270,613 B1 | 8/2001 | Nakagawa et al. | |
|---|---|---|---|
| 2006/0250747 A1* | 11/2006 | Takashima | H01G 4/12 361/272 |

(Continued)

FOREIGN PATENT DOCUMENTS

| JP | 11-45837 A | 2/1999 |
|---|---|---|
| JP | 2007-235170 A | 9/2007 |

(Continued)

OTHER PUBLICATIONS

Korean Office Action issued in Korean Application No. 10-2014-0096350 dated Nov. 18, 2015, with English Translation.

*Primary Examiner* — Dion R Ferguson (74) *Attorney, Agent, or Firm* — McDermott Will & Emery LLP (57) ABSTRACT

A multilayer ceramic capacitor may include: a ceramic body including a plurality of dielectric layers and having first and second end surfaces, third and fourth side surfaces, and upper and lower surfaces; a first unit disposed in the ceramic body and including first internal electrodes exposed to the first and second end surfaces of the ceramic body in the length direction and second internal electrodes having lead portions exposed to the third and fourth side surfaces of the ceramic body in the width direction; a second unit disposed in the ceramic body and including a plurality of first internal electrodes; and first and second external electrodes disposed on the first and second end surfaces of the ceramic body in the length direction, respectively, and fourth external electrodes disposed on the third and fourth side surfaces of the ceramic body in the width direction, respectively.

16 Claims, 4 Drawing Sheets

A-A'

(56) References Cited

U.S. PATENT DOCUMENTS

| | | | | |
|---|---|---|---|---|
| 2008/0186652 A1* | 8/2008 | Lee | ........................ | H01G 4/012 |
| | | | | 361/306.3 |
| 2009/0244807 A1* | 10/2009 | Lee | ........................ | H01G 4/005 |
| | | | | 361/306.2 |
| 2011/0056735 A1* | 3/2011 | Lee | ........................ | H01G 4/005 |
| | | | | 174/260 |
| 2012/0120546 A1 | 5/2012 | Togashi et al. | | |
| 2012/0188684 A1* | 7/2012 | Akazawa | ............... | H01G 4/012 |
| | | | | 361/321.2 |
| 2013/0033154 A1* | 2/2013 | Sakuratani | ............... | H01G 4/30 |
| | | | | 310/366 |
| 2014/0138136 A1* | 5/2014 | Ahn | ........................ | H01G 2/065 |
| | | | | 174/260 |
| 2014/0240895 A1* | 8/2014 | Lee | ........................ | H01G 4/12 |
| | | | | 361/301.4 |
| 2014/0290998 A1* | 10/2014 | Ahn | ........................ | H01G 4/30 |
| | | | | 174/260 |
| 2015/0016014 A1* | 1/2015 | Park | ........................ | H01G 2/065 |
| | | | | 361/301.4 |

FOREIGN PATENT DOCUMENTS

| | | |
|---|---|---|
| JP | 2012-248571 A | 12/2012 |
| JP | 5246245 B2 | 7/2013 |
| KR | 10-2014-0038911 A | 3/2014 |

\* cited by examiner

MULTILAYER CERAMIC CAPACITOR AND BOARD HAVING THE SAME

CROSS-REFERENCE TO RELATED APPLICATION

This application claims the benefit of Korean Patent Application No. 10-2014-0096350 filed on Jul. 29, 2014, with the Korean Intellectual Property Office, the disclosure of which is incorporated herein by reference.

BACKGROUND

The present disclosure relates to a multilayer ceramic capacitor and a board having the same.

A multilayer ceramic capacitor, one of multilayer chip electronic components, is a chip type condenser mounted on a printed circuit board of several electronic products such as an image device, for example, a liquid crystal display (LCD), a plasma display panel (PDP), or the like, a computer, a smart phone, a cellular phone, and the like, to serve to charge or discharge electricity therein or therefrom.

The multilayer ceramic capacitor (MLCC) may be used as components of various electronic devices due to advantages such as a small size, a high capacitance, an easy mounting feature.

The multilayer ceramic capacitor may have a structure in which a plurality of dielectric layers and internal electrodes disposed between the dielectric layers and having different polarities are alternately stacked.

Meanwhile, in accordance with multi-functionalization and high integration of a large scale integration (LSI), current consumption has increased.

Therefore, an increase in a current and a decrease in loss have been demanded in a noise filter that may be adopted as a countermeasure for noise of power.

As a countermeasure for noise of power of the large scale integration (LSI) according to the related art, a three-terminal capacitor having excellent high frequency characteristics has been mainly used.

However, in accordance with the multi-functionalization and the high integration of the large scale integration (LSI), an attempt to improve reliability such as an attempt to prevent deterioration of an insulating resistance depending on a significant increase in a current and a decrease in heat generation of the three-terminal capacitor, or the like, has been stilly required.

RELATED ART DOCUMENT (Patent Document 1) Japanese Patent Laid-Open Publication No. 2007-235170

SUMMARY

An exemplary embodiment in the present disclosure may provide a multilayer ceramic capacitor having excellent reliability, and a board having the same.

According to an exemplary embodiment in the present disclosure, a multilayer ceramic capacitor may include: a ceramic body including a plurality of dielectric layers and having first and second end surfaces in a length direction, third and fourth side surfaces in a width direction, and upper and lower surfaces in a thickness direction; a first unit disposed in the ceramic body and including first internal electrodes exposed to the first and second end surfaces of the ceramic body in the length direction and second internal electrodes having lead portions exposed to the third and fourth side surfaces of the ceramic body in the width direction; a second unit disposed in the ceramic body and including a plurality of first internal electrodes; and first and second external electrodes disposed on the first and second end surfaces of the ceramic body in the length direction, respectively, and connected to the first internal electrodes and third and fourth external electrodes disposed on the third and fourth side surfaces of the ceramic body in the width direction, respectively, and connected to the second internal electrodes, wherein the second unit is disposed below the first unit in the thickness direction of the ceramic body.

A gap between the first and second internal electrodes of the first unit may be larger than a gap between the first internal electrodes of the second unit.

According an exemplary embodiment in the present disclosure, a board having a multilayer ceramic capacitor may include: a printed circuit board having first to third electrode pads disposed thereon; and the multilayer ceramic capacitor as described above installed on the printed circuit board.

A gap between the first and second internal electrodes of the first unit may be larger than a gap between the first internal electrodes of the second unit.

The lower surface of the ceramic body in the thickness direction may be a mounting surface of the printed circuit board.

BRIEF DESCRIPTION OF DRAWINGS

The above and other aspects, features and other advantages in the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe exemplary embodiments in the present disclosure. L, W and T shown in the accompanying drawings refer to a length direction, a width direction, and a thickness direction, respectively. Here, the thickness direction may be used to have the same concept as a stacked direction in which dielectric layers are stacked.

Multilayer Ceramic Capacitor

Exemplary embodiments in the present disclosure will now be described in detail with reference to the accompanying drawings.

Figure 1:
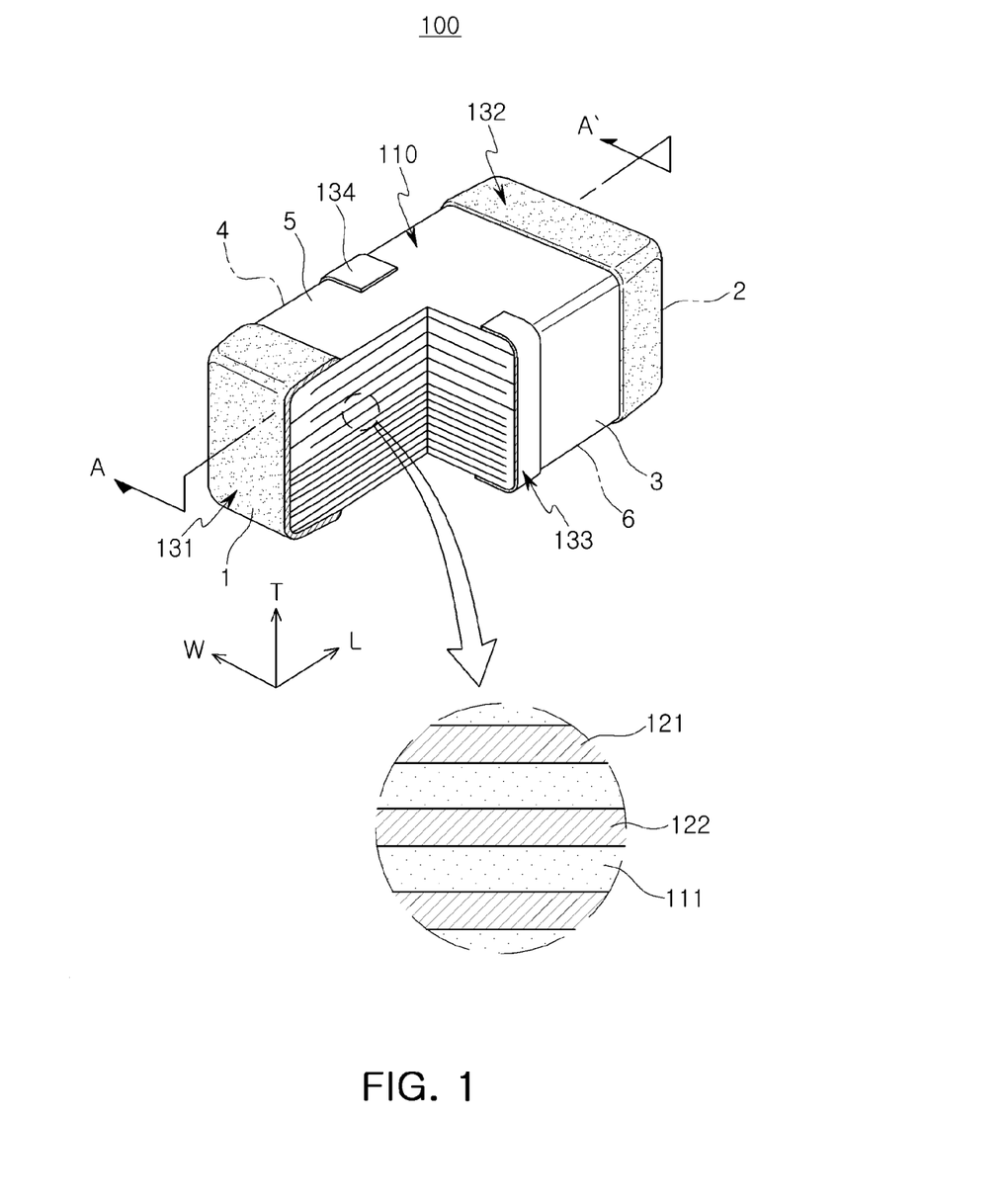
FIG. 1 is a partially cut-away perspective view schematically showing a multilayer ceramic capacitor according to an exemplary embodiment in the present disclosure.

FIG. 1 is a partially cut-away perspective view schematically showing a multilayer ceramic capacitor according to an exemplary embodiment in the present disclosure.

Figure 2:
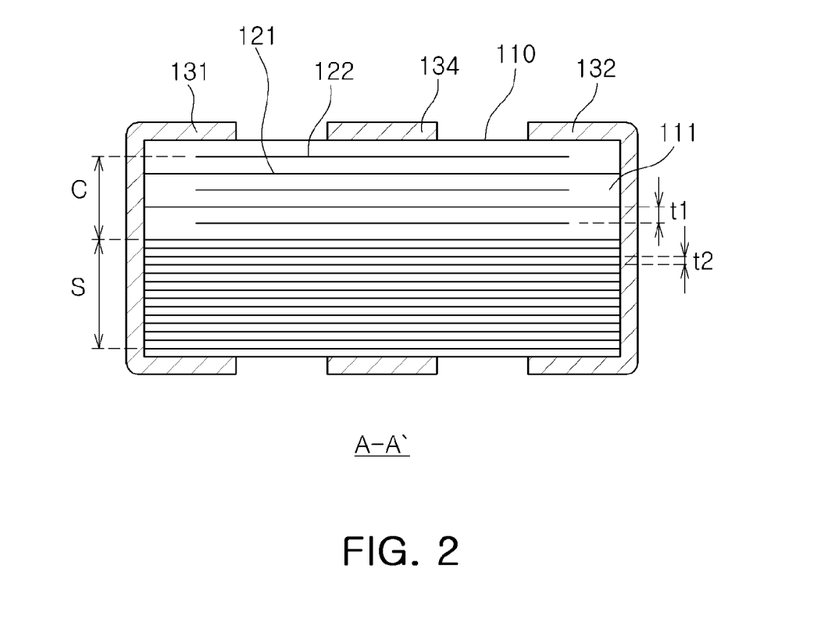
FIG. 2 is a cross-sectional view taken along line A-A' of FIG. 1.

FIG. 2 is a cross-sectional view taken along line A-A' of FIG. 1.

Figure 3:
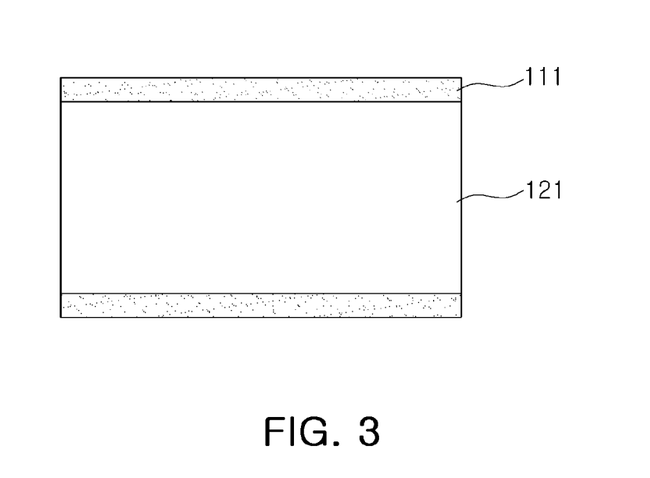
FIG. 3 is a plan view showing a first internal electrode that may be used in the multilayer ceramic capacitor shown in FIG. 1.

FIG. 3 is a plan view showing a first internal electrode that may be used in the multilayer ceramic capacitor shown in FIG. 1.

Figure 4:
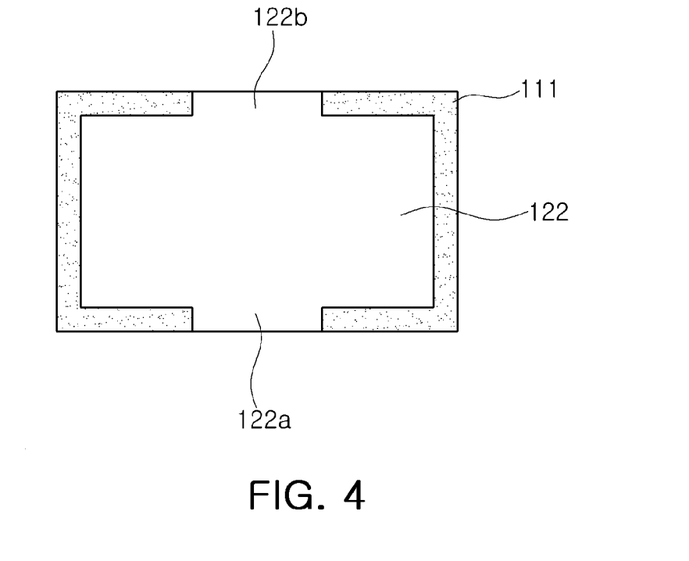
FIG. 4 is a plan view showing a second internal electrode that may be used together with the first internal electrode shown in FIG. 3.

FIG. 4 is a plan view showing a second internal electrode that may be used together with the first internal electrode shown in FIG. 3.

Referring to FIG. 1, a multilayer ceramic capacitor 100 according to an exemplary embodiment in the present disclosure may include a ceramic body 110 including a plurality of dielectric layers 111 and having first and second end surfaces 1 and 2 in a length direction, third and fourth side surfaces 3 and 4 in a width direction, and upper and lower surfaces 5 and 6 in a thickness direction.

In the exemplary embodiment, the ceramic body 110 may have the upper and lower surfaces 5 and 6 opposing each other and the first and second end surfaces 1 and 2 in the length direction and the third and fourth side surfaces 3 and 4 in the width direction that connect the upper and lower surfaces to each other.

A shape of the ceramic body 110 is not particularly limited, but may be a hexahedral shape as shown.

The lower surface 6 of the ceramic body 110 in the thickness direction may be a mounting surface at the time of mounting the multilayer ceramic capacitor on a printed circuit board.

The ceramic body 110 may be formed by stacking a plurality of dielectric layers 111 and include a plurality of first and second internal electrodes 121 and 122 disposed therein so as to be spaced apart from each other with each of the dielectric layers 111 interposed therebetween.

The plurality of dielectric layers 111 forming the ceramic body 110 may be in a sintered state and be integrated so that boundaries between adjacent dielectric layers are not readily apparent.

The dielectric layers 111 may be formed by sintering a ceramic green sheet containing a ceramic powder, an organic solvent, and an organic binder. The ceramic powder, which is a high k material, may be a barium titanate ($BaTiO_3$) based material, a strontium titanate ($SrTiO_3$) based material, or the like, but is not limited thereto.

Referring to FIG. 2, the multilayer ceramic capacitor 100 may include a first unit C disposed in the ceramic body 110 and including the first internal electrode 121 exposed to the first and second end surfaces 1 and 2 of the ceramic body 110 in the length direction and the second internal electrodes 122 having lead portions exposed to the third and fourth side surfaces 3 and 4 of the ceramic body 110 in the width direction.

The first unit C may be defined as a capacitance layer or a capacitor unit formed by overlapping the first and second internal electrodes 121 and 122 with each other.

In addition, a second unit S including a plurality of the first internal electrodes 121 may be disposed in the ceramic body 110.

The second unit S may have a form in which the plurality of first internal electrodes 121 are stacked and may be disposed below the first unit C in the thickness direction of the ceramic body 110 as described below.

The first internal electrodes 121 may be exposed to the first and second end surfaces 1 and 2 of the ceramic body 110 in the length direction, and the first internal electrodes 121 in the second unit S may be defined as signal electrodes.

In addition, due to the disposition as described above, the second unit S may be defined as a heat generation suppressing unit, which will be described in detail below.

The first and second internal electrodes 121 and 122 included in the multilayer ceramic capacitor 100 according to an exemplary embodiment in the present disclosure may be formed of a conductive paste containing a conductive metal.

The conductive metal may be nickel (Ni), copper (Cu), palladium (Pd), or an alloy thereof, but is not limited thereto.

The internal electrodes may be printed on ceramic green sheets forming the dielectric layers, using a conductive paste by a printing method such as a screen printing method or a gravure printing method.

The ceramic green sheets having the internal electrodes printed thereon may be alternately stacked and sintered to form the ceramic body.

According to an exemplary embodiment in the present disclosure, since the second unit S is disposed below the first unit C in the thickness direction of the ceramic body 110, direct current (DC) resistance may be decreased, such that an allowable current value may be set to be high.

In detail, the lower surface 6 of the ceramic body 110 in the thickness direction may be provided as the mounting surface at the time of mounting the multilayer ceramic capacitor 100 on the printed circuit board. In this case, since the second unit S configured of the first internal electrodes 121, which are the signal electrodes, is disposed at a position adjacent to the printed circuit board, an influence of resistance due to a current flowing through the external electrodes is low, such that the overall DC resistance may be decreased.

Since the overall DC resistance may be decreased as described above, heat generation in the ceramic body may be suppressed, such that the allowable current value may be set to be high.

In addition, since the second unit S configured of the first internal electrodes, which are the signal electrodes, is disposed at the position adjacent to the printed circuit board, heat generated by resistances of the signal electrodes and a DC current may be easily discharged to the board.

Therefore, the generation of heat generated in the ceramic body may be suppressed, such that the allowable current value may be set to be high.

In addition, since the second unit S configured of the first internal electrodes 121, which are the signal electrodes, is disposed at the position adjacent to the printed circuit board, a phenomenon that acoustic noise occurring due to mechanical warpage or vibrations at the time of mounting the multilayer ceramic capacitor on the printed circuit board is transferred to a unit forming capacitance or a capacitor unit may be prevented, such that the acoustic noise may be decreased.

In addition, even in a case in which cracks occur in the multilayer ceramic capacitor due to mechanical stress caused by warpage of the printed circuit board, a phenomenon that the crack is transferred to the unit forming capacitance or the capacitor unit may be prevented, such that deterioration of insulating resistance may be prevented.

According to an exemplary embodiment in the present disclosure, a gap between the first and second internal electrodes 121 and 122 of the first unit C may be larger than a gap between the first internal electrodes 121 of the second unit S.

That is, when the gap between the first and second internal electrodes 121 and 122 of the first unit C is defined as t1 and the gap between the first internal electrodes 121 of the second unit S is defined as t2, t1>t2 may be satisfied.

In addition, the number of first internal electrodes 121 stacked in the second unit S may be greater than that of first and second internal electrodes 121 and 122 stacked in the first unit C.

As described above, the gap t1 between the first and second internal electrodes 121 and 122 of the first unit C and the gap t2 between the first internal electrodes 121 of the second unit S are controlled so as to satisfy t1>t2 and the number of first internal electrodes 121 stacked in the second unit S is controlled to be greater than that of first and second internal electrodes 121 and 122 stacked in the first unit C, whereby the allowable current value may be set to be high.

That is, as the number of first internal electrodes 121 stacked in the second unit S is increased, the DC resistance may be decreased, such that the allowable current may be set to be high.

In addition, an electrode density of the second unit S is controlled so as to be higher than that of the first unit C, whereby the allowable current value may be set to be high.

Referring to FIG. 3, the first internal electrodes 121 may be exposed to the first and second end surfaces 1 and 2 of the ceramic body 110 in the length direction, and the first internal electrodes 121 in the second unit S may serve as the signal electrodes.

Referring to FIG. 4, the second internal electrode 122 may have lead portions 122a and 122b exposed to the third and fourth side surfaces 3 and 4 of the ceramic body 110 in the width direction.

In addition, the second internal electrodes 122 may be insulated from the first and second end surfaces 1 and 2 of the ceramic body 110 in the length direction.

The second internal electrodes 122 may be stacked alternately with the first internal electrodes 121 exposed to the first and second end surfaces 1 and 2 of the ceramic body in the length direction to configure the first unit C.

The first unit C may serve as the capacitance layer or the capacitor unit formed by overlapping the first and second internal electrodes 121 and 122 with each other.

That is, a capacitance of the multilayer ceramic capacitor 100 may be in proportion to an area of a region in which the first and second internal electrodes 121 and 122 are overlapped with each other in the first unit C.

The first unit C, which is the capacitance layer or the capacitor unit, may serve as a noise filtering unit for power of a large scale integration (LSI).

In addition, the second unit S may be configured of the first internal electrodes 121, which are the signal electrodes, thereby suppressing the generation of heat in the ceramic body and preventing the acoustic noise and the cracks that may occur at the time of mounting the multilayer ceramic capacitor on the board from being transferred to the first unit C.

Referring to FIGS. 1 and 2, the multilayer ceramic capacitor 100 may include first and second external electrodes 131 and 132 disposed on the first and second end surfaces 1 and 2 of the ceramic body 110 in the length direction, respectively, and connected to the first internal electrodes 121.

The first and second external electrodes 131 and 132 may be connected to the first internal electrodes 121 included in the first unit C and the second unit S and may be defined as input and output terminals of signals.

That is, the signals may be received by the first external electrode 131, which is an input terminal, pass through the first internal electrodes 121, and be output through the second external electrode 132, which is the output terminal of the signal.

Here, the first unit C may filter noise components of the input signals to third and fourth external electrodes 133 and 134, which are ground terminals, through the second internal electrodes 122, as described below.

Meanwhile, the multilayer ceramic capacitor 100 may include the third and fourth external electrodes 133 and 134 disposed on the third and fourth side surfaces 3 and 4 of the ceramic body 110 in the width direction, respectively, and connected to the second internal electrodes 122.

The third and fourth external electrodes 133 and 134 may serve as the ground terminals filtering the noise components of the input signals to a ground.

The third and fourth external electrodes 133 and 134 may be electrically connected to the second internal electrodes 122 through the lead portions 122a and 122b exposed to the third and fourth side surfaces 3 and 4 of the ceramic body 110 in the width direction.

The first to fourth external electrodes 131 to 134 may be formed of a conductive paste containing a conductive metal.

The conductive metal may be nickel (Ni), copper (Cu), tin (Sn), or an alloy thereof, but is not limited thereto.

The conductive paste may further contain an insulating material. The insulating material may be, for example, glass, but is not limited thereto.

A method of forming the first to fourth external electrodes 131 to 134 is not particularly limited. That is, the first to fourth external electrodes 131 to 134 may be formed by dipping the ceramic body or be formed by a method such as a printing method, a plating method, or the like.

The multilayer ceramic capacitor 100 may be a three-terminal capacitor having a total of four external electrodes. However, the present disclosure is not limited thereto.

Meanwhile, according to an exemplary embodiment in the present disclosure, in order to mount the multilayer ceramic capacitor on the printed circuit board so that the second unit S is adjacent to an upper surface of the printed circuit board, a marking for distinguishing upper and lower portions from each other may be formed on at least one of upper and lower surfaces of the ceramic body 110.

The marking may be indicated on the outermost layer among the dielectric layers forming the ceramic body 110, using a ceramic material having a visually distinguishable color different from that of other ceramic materials or be indicated by disposing a ceramic sheet having the marking formed thereon on the outermost layer.

A multilayer ceramic capacitor according to another exemplary embodiment in the present disclosure may include a ceramic body 110 including a plurality of dielectric layers 111 and having first and second end surfaces 1 and 2 in a length direction, third and fourth side surfaces 3 and 4 in a width direction, and upper and lower surfaces 5 and 6 in a thickness direction, a capacitor unit C disposed in the ceramic body 110 and including first internal electrodes 121 exposed to the first and second end surfaces 1 and 2 of the ceramic body 110 in the length direction and second internal electrodes 122 having lead portions 122a and 122b exposed to the third and fourth side surfaces 3 and 4 of the ceramic body 110 in the width direction, a heat generation suppressing unit S disposed below the capacitor unit C within the ceramic body 110, and first and second external electrodes 131 and 132 disposed on the first and second end surfaces 1 and 2 of the ceramic body 110 in the length direction, respectively, and connected to the first internal electrodes 121 and third and fourth external electrodes 133 and 134 disposed on the third and fourth side surfaces 3 and 4 of the ceramic body 110 in the width direction and connected to the second internal electrodes 122. In this case, the heat generation suppressing unit S is a region for decreasing DC resistance.

A description of features the same as those of the multilayer ceramic capacitor according to an exemplary embodiment in the present disclosure described above among features of the multilayer ceramic capacitor according to another exemplary embodiment in the present disclosure will be omitted in order to avoid an overlapped description.

The heat generation suppressing unit S may include a plurality of the first internal electrodes 121. Here, the number of the first internal electrodes 121 stacked in the heat generation suppressing unit S is not particularly limited, but may be greater than that of the first and second internal electrodes 121 and 122 stacked in, for example, the capacitor unit C.

A gap between the first and second internal electrodes 121 and 122 of the capacitor unit C may be greater than a gap between the first internal electrodes 121 of the heat generation suppressing unit S.

The heat generation suppressing unit S may be disposed at a position adjacent to the lower surface of the ceramic body 110 in the thickness direction.

An electrode density of the heat generation suppressing unit S may be higher than that of the capacitor unit C.

Since the heat generation suppressing unit S is disposed below the capacitor unit C in the thickness direction of the ceramic body 110, the DC resistance may be decreased, such that an allowable current value may be set to be high.

In detail, the lower surface 6 of the ceramic body 110 in the thickness direction may be provided as the mounting surface at the time of mounting the multilayer ceramic capacitor 100 on the printed circuit board. In this case, since the heat generation suppressing unit S configured of the first internal electrodes 121, which are the signal electrodes, is disposed at a position adjacent to the printed circuit board, an influence of resistance due to a current flowing through the external electrodes is low, such that the overall DC resistance may be decreased.

Since the overall DC resistance may be decreased as described above, the generation of heat in the ceramic body may be suppressed, such that the allowable current value may be set to be high.

In addition, since the heat generation suppressing unit S configured of the first internal electrodes 121, which are the signal electrodes, is disposed at the position adjacent to the printed circuit board, heat generated by resistance of the signal electrodes and a DC current may be easily discharged to the board.

Therefore, the heat generation in the ceramic body may be suppressed, such that the allowable current value may be set to be high.

In addition, since the heat generation suppressing unit S configured of the first internal electrodes 121, which are the signal electrodes, is disposed at the position adjacent to the printed circuit board, a phenomenon that acoustic noise due to mechanical warpage or vibrations occurring at the time of mounting the multilayer ceramic capacitor on the printed circuit board is transferred to the capacitor unit C forming capacitance may be prevented, such that the acoustic noise may be decreased.

In addition, even in a case in which cracks occur in the multilayer ceramic capacitor due to mechanical stress caused by warpage of the printed circuit board, a phenomenon that the crack is transferred to the capacitor unit C forming capacitance may be prevented, such that deterioration of insulating resistance may be prevented.

That is, the capacitor unit C may serve as a noise filtering unit for power of a large scale integration (LSI).

In addition, the heat generation suppressing unit S may be configured of the first internal electrodes 121, which are the signal electrodes, thereby suppressing the generation of heat in the ceramic body and preventing the acoustic noise and the cracks that may occur at the time of mounting the multilayer ceramic capacitor on the board from being transferred to the capacitor unit C.

Board Having Multilayer Ceramic Capacitor

Figure 5:
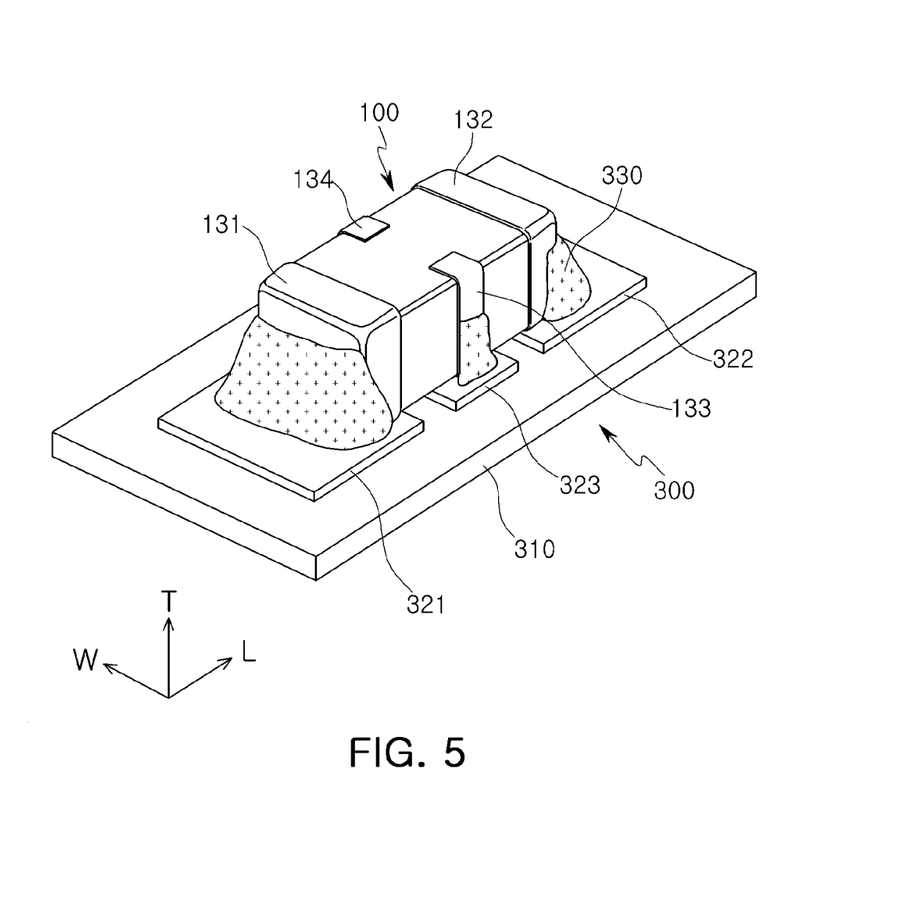
FIG. 5 is a perspective view showing a form in which the multilayer ceramic capacitor of FIG. 1 is mounted on a printed circuit board.

FIG. 5 is a perspective view showing a form in which the multilayer ceramic capacitor of FIG. 1 is mounted on a printed circuit board.

Figure 6:
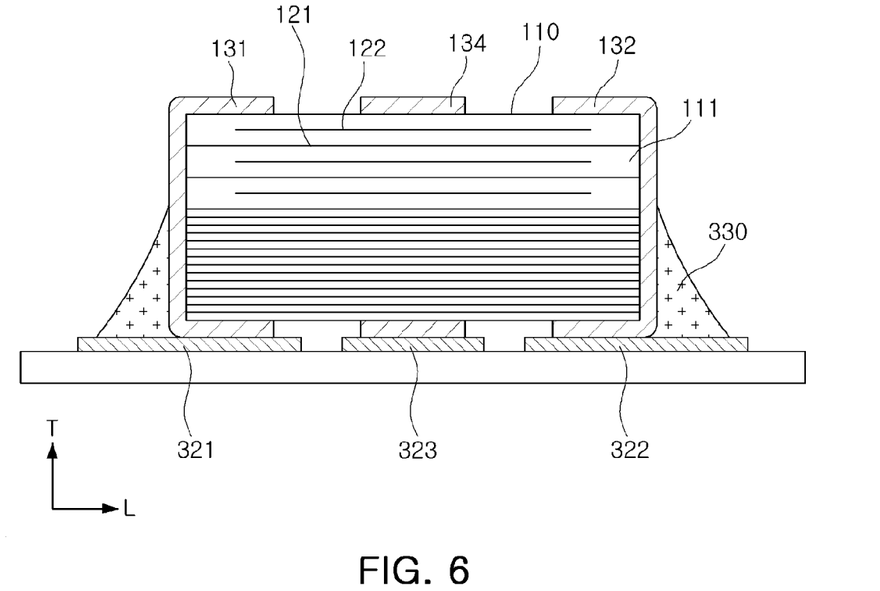
FIG. 6 is a cross-sectional view of the multilayer ceramic capacitor and the printed circuit board of FIG. 5 cut in a length direction.

FIG. 6 is a cross-sectional view of the multilayer ceramic capacitor and the printed circuit board of FIG. 5 cut in a length direction.

Referring to FIGS. 5 and 6, a board 300 having the multilayer ceramic capacitor 100 according to the exemplary embodiment may include a printed circuit board 310 on which the multilayer ceramic capacitor 100 is mounted to be horizontal in relation to the PCB and first to third electrode pads 321 to 323 formed on an upper surface of the printed circuit board 310 to be spaced apart from each other.

Here, the multilayer ceramic capacitor 100 may be electrically connected to the printed circuit board 310 by solder 330 in a state in which the first and second external electrodes 131 and 132 are positioned on the first and second electrode pads 321 and 322 so as to contact the first and second electrode pads 321 and 322, respectively, and the third and fourth external electrodes 133 and 134 are positioned on the third electrode pad 323.

The lower surface 6 of the ceramic body 110 in the thickness direction may be provided as the mounting surface at the time of mounting the multilayer ceramic capacitor 100 on the printed circuit board 310. In this case, since the second unit S configured of the first internal electrodes 121, which are the signal electrodes, is disposed at a position adjacent to the printed circuit board, an influence of resistance due to a current flowing through the external electrodes is low, such that the overall DC resistance may be decreased.

Since the overall DC resistance may be decreased as described above, the generation of heat in the ceramic body may be suppressed, such that the allowable current value may be set to be high.

In addition, since the second unit S configured of the first internal electrodes 121, which are the signal electrodes, is disposed at the position adjacent to the printed circuit board 310, heat generated by resistance of the signal electrodes and a DC current may be easily discharged to the board.

Therefore, the generation of heat in the ceramic body may be suppressed, such that the allowable current value may be set to be high.

In addition, since the second unit S configured of the first internal electrodes 121, which are the signal electrodes, is disposed at the position adjacent to the printed circuit board, a phenomenon that acoustic noise due to mechanical warpage or vibrations occurring at the time of mounting the multilayer ceramic capacitor on the printed circuit board is transferred to a unit or a capacitor unit forming capacitance may be prevented, such that the acoustic noise may be decreased.

When a voltage is applied to the multilayer ceramic capacitor 100 in a state in which the multilayer ceramic capacitor 100 is mounted on the printed circuit board 310, acoustic noise may be generated.

That is, when voltages having different polarities are applied to the first and second external electrodes 131 and 132 formed on both end surfaces of the multilayer ceramic capacitor 100 in the length direction in a state in which the multilayer ceramic capacitor 100 is mounted on the printed circuit board 310, the ceramic body may be expanded and contracted in the thickness direction due to an inverse piezoelectric effect of the dielectric layers 111, and both side portions of the first and second external electrodes 131 and 132 may be contracted and expanded as opposed to the expansion and the contraction of the ceramic body in the thickness direction due to a Poisson effect.

Here, in the multilayer ceramic capacitor according to an exemplary embodiment in the present disclosure, the second unit S is disposed to be adjacent to the lower surface of the ceramic body, which is the mounting surface of the multilayer ceramic capacitor, to thereby decrease the transfer of vibrations generated in the first unit C to the board, whereby the acoustic noise may be decreased.

In addition, even in a case in which cracks occur in the multilayer ceramic capacitor 100 due to mechanical stress caused by warpage of the printed circuit board 310, a phenomenon that the crack is transferred to the first unit or the capacitor unit C forming capacitance may be prevented, such that deterioration of insulating resistance may be prevented.

Figure 7:
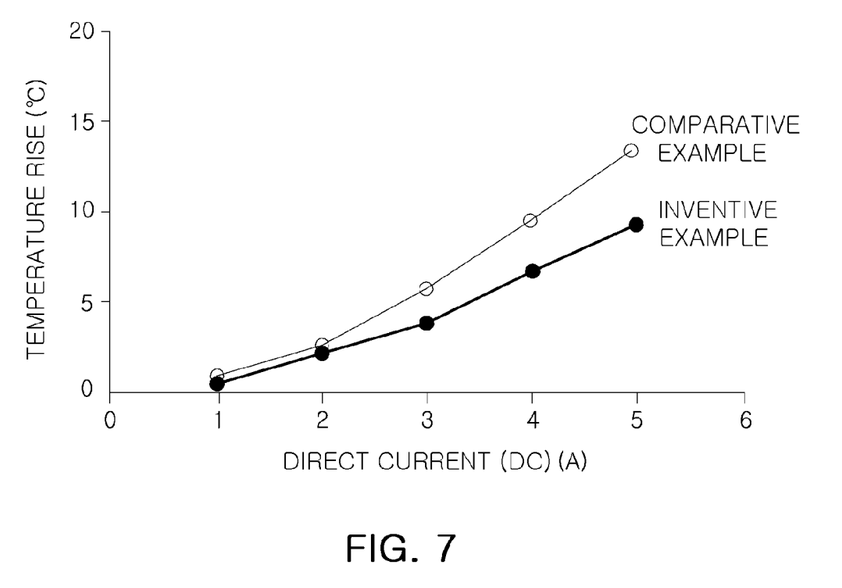
FIG. 7 is a graph showing a change in temperature rise depending on a direct current (DC) current according to Inventive Example and Comparative Example.

FIG. 7 is a graph showing a change in temperature rise depending on a DC current according to Inventive Example and Comparative Example.

Referring to FIG. 7, it may be appreciated that a degree of temperature rise depending an applied DC current is less in a multilayer ceramic capacitor according to Inventive Example than in a multilayer ceramic capacitor according to Comparative Example, a multilayer ceramic capacitor according to the related art, such that an allowable current value may be set to be higher in the multilayer ceramic capacitor according to Inventive Example than in the multilayer ceramic capacitor according to Comparative Example.

As set forth above, according to exemplary embodiments in the present disclosure, DC resistance may be decreased, such that the allowable current value may be set to be high.

In addition, loss in internal power may be low, and a decrease in reliability or lifespan characteristics due to a self heat generation may be prevented.

Further, a phenomenon that acoustic noise due to mechanical warpage or vibrations occurring at the time of mounting the multilayer ceramic capacitor on the printed circuit board is transferred to a unit or a capacitor unit forming capacitance may be prevented, such that the acoustic noise may be decreased.

Furthermore, even in a case in which cracks occur in the multilayer ceramic capacitor due to mechanical stress caused by warpage of the printed circuit board, a phenomenon that the crack is transferred to the unit or the capacitor unit forming capacitance may be prevented, such that deterioration of insulating resistance may be prevented.

While exemplary embodiments have been shown and described above, it will be apparent to those skilled in the art that modifications and variations could be made without departing from the scope of the invention as defined by the appended claims.

What is claimed is:

1. A multilayer ceramic capacitor comprising:
a ceramic body including a plurality of dielectric layers and having first and second end surfaces in a length direction, third and fourth side surfaces in a width direction, and upper and lower surfaces in a thickness direction;
a first unit disposed in the ceramic body and including first internal electrodes exposed to the first and second end surfaces of the ceramic body in the length direction and second internal electrodes having lead portions exposed to the third and fourth side surfaces of the ceramic body in the width direction;
a second unit disposed in the ceramic body and consisting of a plurality of first internal electrodes; and
first and second external electrodes disposed on the first and second end surfaces of the ceramic body in the length direction, respectively, and connected to the first internal electrodes and third and fourth external electrodes disposed on the third and fourth side surfaces of the ceramic body in the width direction, respectively, and connected to the second internal electrodes,
wherein the second unit is disposed below the first unit in the thickness direction of the ceramic body, and
wherein a gap between the first and second internal electrodes of the first unit is larger than a gap between the first internal electrodes of the second unit.

2. The multilayer ceramic capacitor of claim 1, wherein the second unit is disposed at a position adjacent to the lower surface of the ceramic body in the thickness direction.

3. The multilayer ceramic capacitor of claim 1, wherein the lower surface of the ceramic body in the thickness direction is a mounting surface.

4. The multilayer ceramic capacitor of claim 1, wherein the number of first internal electrodes stacked in the second unit is greater than that of first and second internal electrodes stacked in the first unit.

5. The multilayer ceramic capacitor of claim 1, wherein an electrode density of the second unit is higher than that of the first unit.

6. A multilayer ceramic capacitor comprising:
a ceramic body including a plurality of dielectric layers and having first and second end surfaces in a length direction, third and fourth side surfaces in a width direction, and upper and lower surfaces in a thickness direction;
a capacitor unit disposed in the ceramic body and including first internal electrodes exposed to the first and second end surfaces of the ceramic body in the length direction and second internal electrodes having lead portions exposed to the third and fourth side surfaces of the ceramic body in the width direction;

a heat generation suppressing unit disposed below the capacitor unit within the ceramic body; and first and second external electrodes disposed on the first and second end surfaces of the ceramic body in the length direction, respectively, and connected to the first internal electrodes and third and fourth external electrodes disposed on the third and fourth side surfaces of the ceramic body in the width direction and connected to the second internal electrodes, wherein the heat generation suppressing unit is a region for decreasing direct current (DC) resistance, wherein the heat generation suppressing unit consists of a plurality of the first internal electrodes, and wherein a gap between the first and second internal electrodes of the capacitor unit is larger than a gap between the first internal electrodes of the heat generation suppressing unit.

7. The multilayer ceramic capacitor of claim 6, wherein the lower surface of the ceramic body in the thickness direction is a mounting surface.

8. The multilayer ceramic capacitor of claim 6, wherein the heat generation suppressing unit is disposed at a position adjacent to the lower surface of the ceramic body in the thickness direction.

9. The multilayer ceramic capacitor of claim 6, wherein the number of first internal electrodes stacked in the heat generation suppressing unit is greater than that of first and second internal electrodes stacked in the capacitor unit.

10. The multilayer ceramic capacitor of claim 6, wherein an electrode density of the heat generation suppressing unit is higher than that of the capacitor unit.

11. A board having a multilayer ceramic capacitor, comprising:

a printed circuit board having first to third electrode pads disposed thereon; and the multilayer ceramic capacitor of claim 1 mounted on the printed circuit board.

12. The board of claim 11, wherein a gap between the first and second internal electrodes of the first unit is larger than a gap between the first internal electrodes of the second unit.

13. The board of claim 11, wherein the second unit is disposed at a position adjacent to the lower surface of the ceramic body in the thickness direction.

14. The board of claim 11, wherein the lower surface of the ceramic body in the thickness direction is a mounting surface.

15. The board having a multilayer ceramic capacitor of claim 11, wherein the number of first internal electrodes stacked in the second unit is greater than that of first and second internal electrodes stacked in the first unit.

16. The board having a multilayer ceramic capacitor of claim 11, wherein an electrode density of the second unit is higher than that of the first unit.

* * * * *